(12) United States Patent
Ke et al.

(10) Patent No.: US 10,568,022 B2
(45) Date of Patent: Feb. 18, 2020

(54) METHODS FOR ENABLING USER EQUIPMENT TO ACCESS RADIO NETWORK, NETWORK EQUIPMENTS AND USER EQUIPMENTS

(71) Applicant: Samsung Electronics Co., Ltd., Suwon-si, Gyeonggi-do (KR)

(72) Inventors: Xiaowan Ke, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/551,584

(22) Filed: Aug. 26, 2019

(65) Prior Publication Data

US 2019/0380089 A1    Dec. 12, 2019

Related U.S. Application Data

(63) Continuation of application No. 15/544,846, filed as application No. PCT/KR2016/000557 on Jan. 19, 2016, now Pat. No. 10,397,858.

(30) Foreign Application Priority Data

Jan. 19, 2015    (CN) .......................... 2015 1 0026042

(51) Int. Cl.
    *H04W 48/10*    (2009.01)
    *H04W 60/04*    (2009.01)
    (Continued)

(52) U.S. Cl.
    CPC ........... *H04W 48/18* (2013.01); *H04W 48/10* (2013.01); *H04W 48/12* (2013.01); *H04W 60/04* (2013.01);
    (Continued)

(58) Field of Classification Search
    CPC ..... H04W 48/18; H04W 48/10; H04W 48/12; H04W 76/30; H04W 76/10; H04W 60/04; H04W 60/06
    (Continued)

(56) References Cited

U.S. PATENT DOCUMENTS 9,158,449 B2 * 10/2015 Matsubara ............ G06F 3/0488
9,820,122 B2 * 11/2017 Chen .................... H04W 48/16
(Continued)

FOREIGN PATENT DOCUMENTS

| WO | 2009083893 A1 | 7/2009 |
| WO | 2012153962 A1 | 11/2012 |
| WO | 2013112083 A1 | 8/2013 |

OTHER PUBLICATIONS

Written Opinion of the International Searching Authority dated May 11, 2016 in connection with International Patent Application No. PCT/KR2016/000557.

(Continued)

*Primary Examiner* — William Nealon

(57) ABSTRACT

The present application discloses a method for enabling a user equipment to access a radio network, a network equipment and a user equipment. A specific embodiment of the method comprises: determining, by a network equipment, whether a predetermined condition is satisfied; and if yes, the method further comprises: transmitting, by the network equipment, information indicating whether a radio network to which the network equipment belongs is isolated, such that the user equipment performs related operations. In the embodiment, the network equipment informs UE of state information about whether the radio network to which network equipments belongs is isolated or not in different ways, so that the isolated network can provide users with reliable local bearer supporting service continuity, thereby (Continued)

meeting communication requirements for public safety and the like.

20 Claims, 10 Drawing Sheets

(51) Int. Cl.
H04W 76/30 (2018.01)
H04W 60/06 (2009.01)
H04W 48/18 (2009.01)
H04W 48/12 (2009.01)
H04W 76/10 (2018.01)

(52) U.S. Cl.
CPC .......... *H04W 76/10* (2018.02); *H04W 76/30* (2018.02); *H04W 60/06* (2013.01)

(58) Field of Classification Search
USPC ........................................................ 455/435.1
See application file for complete search history.

(56) References Cited

U.S. PATENT DOCUMENTS

| | | | | |
|---|---|---|---|---|
| 9,854,502 | B2 * | 12/2017 | Lee | H04W 4/90 |
| 2002/0034940 | A1 * | 3/2002 | Takae | H04M 3/42 |
| | | | | 455/418 |
| 2002/0193101 | A1 * | 12/2002 | McAlinden | G06F 9/44505 |
| | | | | 455/419 |
| 2009/0088142 | A1 * | 4/2009 | Baribault | H04M 3/42 |
| | | | | 455/418 |
| 2009/0275318 | A1 * | 11/2009 | Lee | G06F 11/1458 |
| | | | | 455/418 |
| 2009/0327727 | A1 * | 12/2009 | Meijer | G06F 21/31 |
| | | | | 713/170 |
| 2010/0177766 | A1 * | 7/2010 | daCosta | H04L 65/1069 |
| | | | | 370/352 |
| 2011/0294535 | A1 * | 12/2011 | Aoyagi | H04W 36/14 |
| | | | | 455/525 |
| 2012/0076000 | A1 * | 3/2012 | Pison | H04W 76/10 |
| | | | | 370/241 |
| 2012/0202492 | A1 * | 8/2012 | Moisanen | H04W 60/00 |
| | | | | 455/435.1 |
| 2014/0051394 | A1 * | 2/2014 | Grech | H04L 63/08 |
| | | | | 455/411 |
| 2014/0136351 | A1 * | 5/2014 | Lennon | G06Q 20/12 |
| | | | | 705/18 |
| 2014/0146750 | A1 | 5/2014 | Kim et al. | |
| 2014/0357277 | A1 * | 12/2014 | Asplund | H04W 48/18 |
| | | | | 455/437 |
| 2015/0327306 | A1 * | 11/2015 | Oostveen | H04W 8/30 |
| | | | | 455/423 |
| 2015/0350888 | A1 * | 12/2015 | Miranda | H04M 15/715 |
| | | | | 705/16 |
| 2016/0205550 | A1 * | 7/2016 | Rajadurai | H04W 4/90 |
| | | | | 455/411 |
| 2017/0078470 | A1 * | 3/2017 | Lee | H04W 4/50 |
| 2017/0078947 | A1 * | 3/2017 | Lee | H04W 4/90 |
| 2017/0188325 | A1 * | 6/2017 | Tsai | H04W 8/04 |
| 2018/0020399 | A1 * | 1/2018 | Ke | H04W 48/10 |

OTHER PUBLICATIONS

International Search Report dated May 11, 2016 in connection with International Patent Application No. PCT/KR2016/000557.
3GPP WG2 Meeting #107, S2-150581, (Jan. 2015).

* cited by examiner

| Receiving, by the user equipment, information from a network equipment, wherein the received information indicates whether the radio network to which the network equipment belongs is isolated, and the information is transmitted by the network equipment in response to a predetermined condition being satisfied | 301 |

↓

| The user equipment performs related operations according to the received information | 302 |

METHODS FOR ENABLING USER EQUIPMENT TO ACCESS RADIO NETWORK, NETWORK EQUIPMENTS AND USER EQUIPMENTS

CROSS-REFERENCE TO RELATED APPLICATIONS

This application is a continuation of application Ser. No. 15/544,846, which is the National Stage of International Application No. PCT/KR2016/000557, filed Jan. 19, 2016, which claims priority to Chinese Patent Application No. 201510026042.7, filed Jan. 19, 2015, the disclosures of which are incorporated herein by reference into the present disclosure as if fully set forth herein.

BACKGROUND

1. Field

The present application relates to the technical field of radio communication, particularly, to the technical field of accessing to a radio network, and especially to a method for enabling a user equipment to access a radio network, a network equipment and a user equipment.

2. Description of Related Art

With continuous development of communication technologies, modern mobile communications tend to increasingly provide users with multimedia services with high-speed transmission. FIG. 1 illustrates a system architecture diagram of SAE (System Architecture Evolution). As shown in FIG. 1, a UE (User Equipment) 101 is a terminal apparatus for supporting a network protocol. An E-UTRAN (Evolved UMTS Terrestrial Radio Access Network) 102 is a radio access network comprising a base station (eNodeB/Node B) for providing the UE with interfaces to access radio network. An MME (Mobility Management Entity) 103 is responsible for managing mobility contexts, session contexts and security information of the UE. An SGW (Serving Gateway) 104 mainly provides a functionality of user plane. MME 103 and SGW 104 may be located in the same physical entity. A PGW (Packet Data Network Gateway) 105 is responsible for billing, legally interception and etc. PGW 105 and SGW 104 may also be located in the same physical entity. A PCRF (Policy charging and rules function) 106 provides QoS (Quality of Service) strategies and charging rules. An SGSN (Serving GPRS Support Node) 108 is a network node apparatus for providing data routing in a UMTS (Universal Mobile Telecommunications System). An HSS (Home Subscriber Server) 109 is a home ownership subsystem of UE and is responsible for protecting user equipment information, such as current locations of the user equipment, addresses of the service nodes, user equipment security information and packet data contexts of the user equipment.

It is known from FIG. 1 that, generally, the user equipment (UE) may establish a communication connection with an operator core network (hereinafter, abbreviated to a macro core network to distinguish it from a local core network) through a radio access network to which UE accesses. However, when the radio access network is an isolated network (i.e., there is no connection between the radio access network and the macro core network), UE accessing to the radio access network cannot communicate with the macro core network. Here, there are several conditions in which the radio access network becomes the isolated network as below: (1) a fixed base station loses a backhaul network connection with the core network and cannot be connected with the core network in the isolated state. One or more isolated and fixed base stations may constitute an isolated radio network. (2) For requirements of communication services with public safety, some nomadic base stations are deployed temporarily in some areas without macro radio network coverage in order to provide the public safety users with public safety services. These nomadic base stations generally do not have the backhaul to connect to core network entities of the macro network. One or more nomadic base stations may constitute an isolated radio network. (3) One or more isolated and fixed base stations and nomadic base stations may constitute an isolated radio network.

When the radio access network is isolated completely or the bandwidth between the radio access network and the core network is limited, it is still desired that safe and reliable services can be at least provided to the public safety UE, thereby supporting implementation with public safety tasks. At present, in order to make the isolated radio network providing the public safety public safety UE services, a local core network can be enabled for the isolated radio network. Particularly, if the fixed or nomadic base stations support functions of local core network, after the base stations become the isolated state, the local core network can be enabled to serve UE(s), to provide reliable local bearer for UE(s). Alternatively, when an isolated base station detects a local core network which is allowed to connect, for example, the local core network enabled by another base station, the isolated base station can establish connections with the detected local core network, and then provide UE with services. Generally, there is no connection between the local core network and the macro core network.

Although the isolated radio access network and the local core network can constitute an integral isolated radio network, there are also several problems in an aspect of enabling the user equipment to access the radio network.

SUMMARY

The present application provides a method for enabling a user equipment to access a radio network, a network equipment and a user equipment to address one or more problems in the prior art.

In a first aspect, the present application provides a method for enabling a user equipment to access a radio network, comprising: determining, by a network equipment, whether a predetermined condition is satisfied; and if yes, the method further comprises: transmitting, by the network equipment, information indicating whether a radio network to which the network equipment belongs is isolated, such that the user equipment performs related operations.

In some embodiments, the predetermined condition is a state change of the network equipment, and wherein the state change comprises a change from a state of macro network connection to a state of isolated network, a change from one isolated network to another isolated network, or a recovery from the state of isolated network to the state of macro network connection; and wherein the transmitting comprises: instructing the user equipment to carry out a detachment or re-attachment operation.

In some embodiments, the instructing comprises: determining a user equipment which needs to be detached or re-attached, according to a radio context of the user equipment in a radio access network; and transmitting a detachment request message or a re-attachment request message to the determined user equipment.

In some embodiments, the instructing comprises: receiving a location update request message or a service request message transmitted by the user equipment; determining whether there is a context of the user equipment in the network equipment; and transmitting a location update rejection message or a service rejection message to the user equipment, if there is no context of the user equipment, wherein the location update rejection message or the service rejection message, of which a rejection reason indicates the detachment or re-attachment.

In some embodiments, the method further comprises: modifying a tracking area identification (TAI) of a cell as a predetermined TAI, which is dedicated to the isolated network, if the state of the network equipment changes from the state of macro network connection to the state of isolated network or from one isolated network to another isolated network, wherein the location update request message or the service request message is transmitted by the user equipment upon the predetermined TAI is detected.

In some embodiments, the instructing comprises: releasing the user equipment in a connection state, wherein a releasing reason indicates the detachment or the re-attachment.

In some embodiments, the method further comprises: determining, according to a preset subscription information of the user equipment regarding allowance of access an isolated network, whether it is allowed for the user equipment to access the isolated network.

In some embodiments, the predetermined condition comprises: an expiration of a predetermined time, or the network equipment being in a state of isolated network when it is enabled, or a state change of the network equipment, and wherein the state change comprises: a change from a state of macro network connection to a state of isolated network, a change from one isolated network to another isolated network, or a recovery from the state of isolated network to the state of macro network connection; and wherein the transmitting comprises: transmitting a cell system information, wherein the cell system information is set as a cell system information dedicated to an isolated radio network, when the radio network to which the network equipment currently belongs is isolated.

In some embodiments, the cell system information which is dedicated to the isolated radio network comprises at least one of: a public land mobile network (PLMN) identification which is dedicated to the isolated radio network; a tracking area identification (TAI) which is dedicated to the isolated radio network; a closed subscriber group (CSG) identification which is dedicated to the isolated radio network; an identification which is dedicated to the isolated radio network; an isolated state indication; information indicating whether or not a user equipment associated with any one of the above identifications will be allowed to access the network; a cell barring indication for preventing such a user equipment that has the subscription information indicating that it is not allowed to access the network from initiating an access request; an access class barring information of the isolated radio network, which indicates the class of a user equipment which is allowed or not to access the isolated radio network; and an indication information indicating whether the user equipment is detached or re-attached.

In some embodiments, the method further comprises: updating the cell system information to a cell system information of a macro network or an isolated network to which the network equipment belongs, in response to the state change of the network equipment.

In some embodiments, the network equipment is a base station or a mobility management entity apparatus.

In a second aspect, the present application provides a method for a user equipment accessing to a radio network, comprising: receiving, by the user equipment, information from a network equipment, wherein the received information indicates whether the radio network to which the network equipment belongs is isolated, and the information is transmitted by the network equipment in response to a predetermined condition being satisfied; and performing related operations according to the received information.

In some embodiments, the predetermined condition is a state change of network equipment, and wherein the state change comprises: a change from a state of macro network connection to a state of isolated network, a change from one isolated network to another isolated network, or a recovery from the state of isolated network to the state of macro network connection; and wherein the receiving comprises: receiving an instruction of detachment or re-attachment; and the performing comprises: deleting a context of previously attached Evolved Packet System (EPS); or initiating an attachment to the network equipment.

In some embodiments, the receiving comprises any one of: receiving a detachment request message or re-attachment request message; receiving a detachment request message, wherein the detaching is caused due to a re-attachment; receiving a location update rejection message or a service rejection message, of which a rejection reason indicates the detachment or re-attachment; and receiving a RRC connection release message, of which a releasing reason indicates detachment or re-attachment.

In some embodiments, the performing comprises: determining whether or not to access the radio network, at least in part based on a preset subscription information of the user equipment regarding whether it is allowed to access the isolated network, and if yes, initiating attachment to the network equipment; otherwise, deleting a context of previously attached Evolved Packet System (EPS) or the attachment to the network equipment will not be initiated.

In some embodiments, the predetermined condition comprises: an expiration of a predetermined time, or the network equipment being in a state of isolated network when it is enabled, or a state change of the network equipment, wherein the state change comprises: a change from a state of macro network connection to a state of isolated network, a change from one isolated network to another isolated network, or a recovery from the state of isolated network to the state of macro network connection; the receiving comprises: receiving a cell system information, wherein the cell system information is configured as a cell system information dedicated to the isolated radio network, when the network equipment is isolated; and the performing comprises: determining whether the context of previously attached evolved packet system (EPS) is deleted or the attachment is initiated, according to the cell system information.

In some embodiments, the cell system information dedicated to the isolated radio network comprises at least one of: a public land mobile network (PLMN) identification dedicated to the isolated radio network; a tracking area identification (TAI) dedicated to the isolated radio network; a closed subscriber group (CSG) identification dedicated to the isolated radio network; an identification dedicated to the isolated radio network; an isolated state indication; information indicating whether it is allowed to access the user equipment associated with any one of the above identifications; a cell barring indication for preventing the user equipment having subscription information which is not allowed to access from initiating a request for accessing; an access class barring information of the isolated radio network indicating class of a user equipment which is allowed or rejected to access the isolated radio network; and indication information indicating whether the user equipment is detached or re-attached.

In some embodiments, when the received cell system information is the cell system information dedicated to the isolated radio network, the performing comprises: determining access the radio network, at least in part based on the cell system information and the preset subscription information of the user equipment regarding whether it is allowed to access the isolated network; and initiating attachment to the network equipment in response to the access being determined.

In some embodiments, when a plurality of cell system information are received, the performing comprises: determining whether the cell and a cell in which the user equipment resides previously belong to a same isolated network, or belong to the macro network, or whether there is a connection between the network to which the cell belongs and the network to which the cell in which the user equipment resides previously belongs, according to the cell system information; and selecting preferably the cell belonging to the same isolated network as the cell in which the user equipment resides previously or the cell belonging to the macro network or the cell having connections with the cell in which the user equipment resides previously, during re-selection of cell.

In some embodiments, the performing further comprises: initiating attachment to the network equipment's of the selected cell, if the selected cell after the cell re-selection and a cell in which the user equipment resides previously do not belong to a same isolated network, or do not belong to the macro network, or there is no connection there between.

In a third aspect, the present application provides a network equipment comprising a receiver, a transmitter and a processor, wherein the processor is configured to determine whether a predetermined condition is satisfied; and control the transmitter to transmit information indicating whether a radio network to which the network equipment belongs is isolated, if it is determined that the predetermined condition is satisfied; and the transmitter is configured to transmit the information under the control of the processor, and the processor is further configured to control the receiver and the transmitter to perform operations associated with a user equipment.

In the fourth aspect, the present application provides a user equipment comprising: a transmitter; a receiver configured to receive, from a network equipment, information indicating whether a radio network to which the network equipment belongs is isolated, wherein the information is transmitted by the network equipment in response to a predetermined condition being satisfied; and a processor configured to control the transmitter to perform related operations according to the information.

With the method for enabling the user equipment to access the radio network, the network equipment and the user equipment provided by the present application, state information regarding whether the radio network to which the network equipment belongs is isolated or not is informed to UE via the network equipment in different ways, so that the isolated network can provide the users with reliable local bearer supporting service continuity, thereby meeting communication requirements with public safety and the like.

BRIEF DESCRIPTION OF THE DRAWINGS

Further features, objects and advantages of the present application will be more apparent with a review of a detailed description of the non-limiting embodiments set forth below with reference to the attached drawings.

FIG. 3 illustrates a flowchart 300 of one example of the method for enabling the user equipment to access the radio network provided by the present application and implemented at the user equipment side;

DETAILED DESCRIPTION

Figure 1:
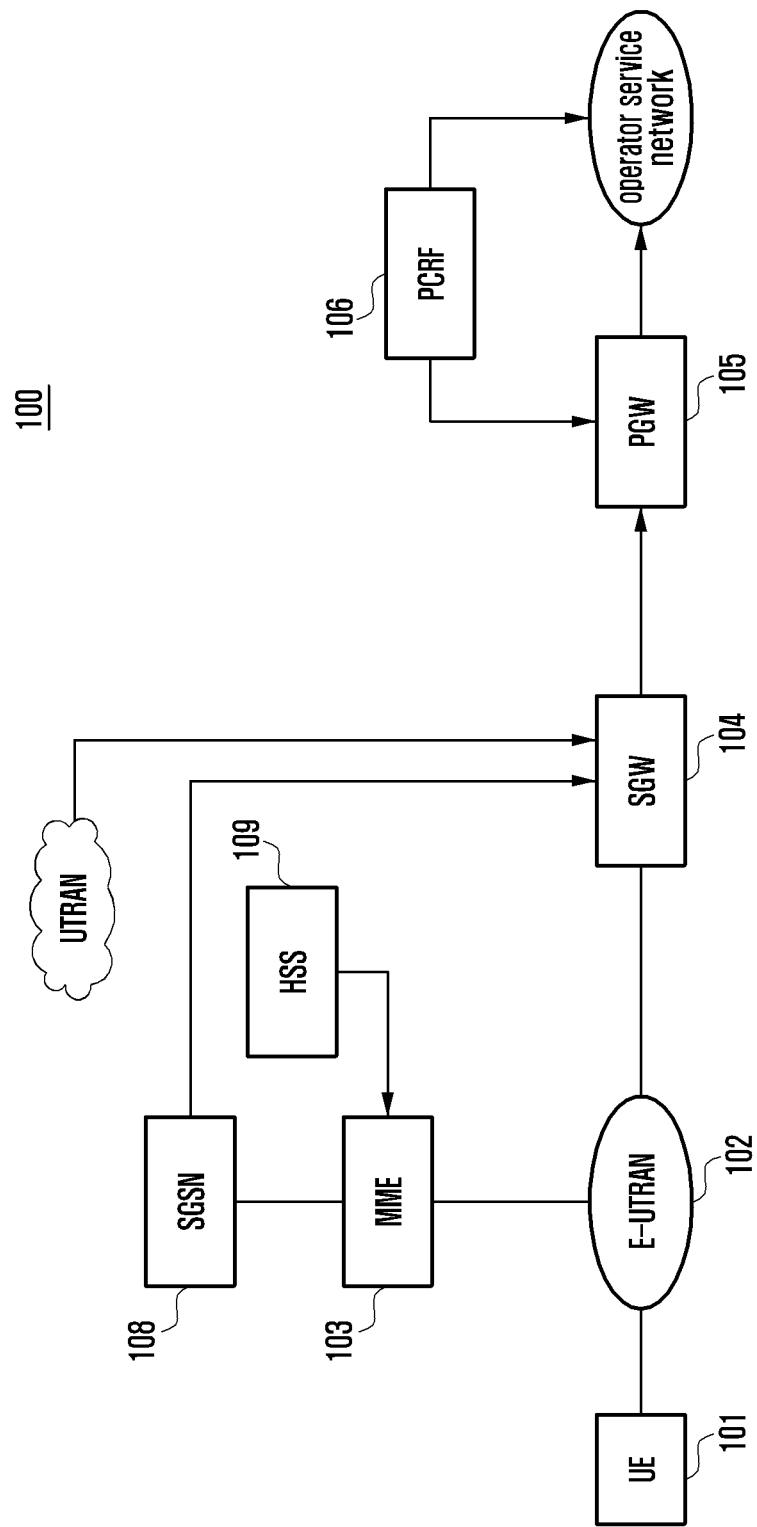
FIG. 1 is a system architectural diagram of a System Architecture Evolution (SAE)

Hereinafter, the present application will be further explained in detail in connection with the embodiments and the accompanying drawings. It should be understood that specific embodiments described herein are only intended to explain the relevant invention, rather than to limit the invention. In addition, it should be noted that only a portion associated with the present invention is shown in the accompanying drawings for ease of description.

Provided that there is no conflict, it should be noted that the embodiments, and features in the embodiments of the present application may be combined. Hereinafter, the present application will be explained in detail with reference to the accompanying drawings in connectivity with the embodiments.

Hereinafter, a base station (BS) is an access apparatus for accessing a communication apparatus to a cellular network and is used to allocate communication resources to the communication apparatus. The base station may be any one entity of an enhanced Node B (eNB), a Node B, a radio access unit, a base station controller, a base transceiver station and etc. The communication apparatus may be any apparatus intended to access services via access networks and may be configured to communicate through the access networks. For example, the communication apparatus may comprise, but not limit to, a user equipment (UE), a mobile station (MS), a cellular phone, a smart phone, a computer or a multimedia system with communication functions. It should be noted that terms "communication apparatus", "user equipment" and "user terminal" may be used interchangeably hereinafter.

It also should be noted that, although embodiments are described hereinafter in a cellular network of LTE/LTE-A type for purposes of illustration, those skilled in the art can recognize that the disclosed embodiments can also be applied to other types of cellular network.

As mentioned above, although the isolated radio access network together with the local core network can constitute an integral isolated radio network, there are many problems as below.

Problem (1): UE is unaware of the base station becoming isolated. The isolated radio network generally only allows the public safety UE to access. The nonpublic safety UE may initiate access aimlessly, thereby causing unnecessary access overhead and affecting the access of the public safety UE. For the public safety UE in the coverage of the isolated base station, if the UE has attached to the macro core network previously, the UE could misunderstand that it can continuously obtain services via that base station, since the UE doesn't know the core network of the isolated network to which the base station belongs does not have the UE contexts.

Problem (2): The UE does not know that the base station is recovered from the isolated state. For example, after the backhaul between the base station and the macro core network is repaired, the base station can re-connect to the macro core network. At this time, the base station may close or disengage from the core network of the isolated network. For the public safety UE in the coverage of the base station, if the UE has attached to the core network of the isolated network previously, the UE will misunderstand that it can continuously obtain services via that base station, since the UE doesn't know the macro core network to which the base station connects does not have the UE context. For the nonpublic safety UE, which tried to attach to the isolated network via the base station but is rejected previously, may misunderstand that that base station still cannot be accessed to.

Problem (3): UE does not know that the base station changes from one isolated network to another isolated network. For example, a nomadic base station is disengaged from an isolated network and becomes a new isolated network or joins another isolated network. At this time, the core network to which the base station connects will change, and there may be no connection between the core network before state changed and the core network after state changed. The core network after state changed does not have the context of UE which has attached to the core network before state changed. Therefore, UE does not know that the core network to which the base station connects has changed and will misunderstand that it can continuously obtain services via that base station.

Problem 4: when UE moves under the coverage of isolated network and moves from cell-1 to cell-2, several circumstances may exist. (1) t cell-1 belongs to the macro network while cell-2 belongs to an isolated network; (2) cell-1 belongs to an isolated network while cell-2 belongs to the macro network; (3) cell-1 belongs to isolated network-1 while cell-2 belongs to isolated network-2; and (4) both cell-1 and cell-2 belong to the same isolated network. For the first three circumstances, there is no interconnection or interworking between the network of cell-1 and the network of cell-2. If a UE has attached the network of cell-1, the context of the UE cannot be transmitted to the network of cell-2. If the UE wants to obtain services via cell-2, it needs to re-attach to the network of cell-2. The four circumstances cannot be distinguished by UE by now.

Problem 5: there is a plurality of isolated radio network in the radio environment, and there are no interconnections or interworking between these isolated radio networks. When UE moves among cells of the isolated network, to avoid a re-attachment, UE can select preferably the cell of the isolated network to which UE has attached previously. However, UE cannot distinguish which cell belongs to which isolated network respectively.

Problem 6: when there is overlapped coverage between the isolated radio access network and the normal radio access network, when selecting cells, UE can select preferably the cell of the normal radio access network connected with the macro core network. Therefore, UE can access external internet or other applications through the mobile network without re-initiating attachment, thereby protecting service continuity. However, UE does not know which network is isolated radio access network or which network is the normal radio access network.

Problem 7: there might be not the public safety UE related authorization information in the local core network.

To address one or more problems as described above and to enable UE to know information regarding whether the network to which the network equipment belongs is isolated or not, an embodiment of the present application provides a solution for enabling the user equipment to access the radio network.

Figure 2:
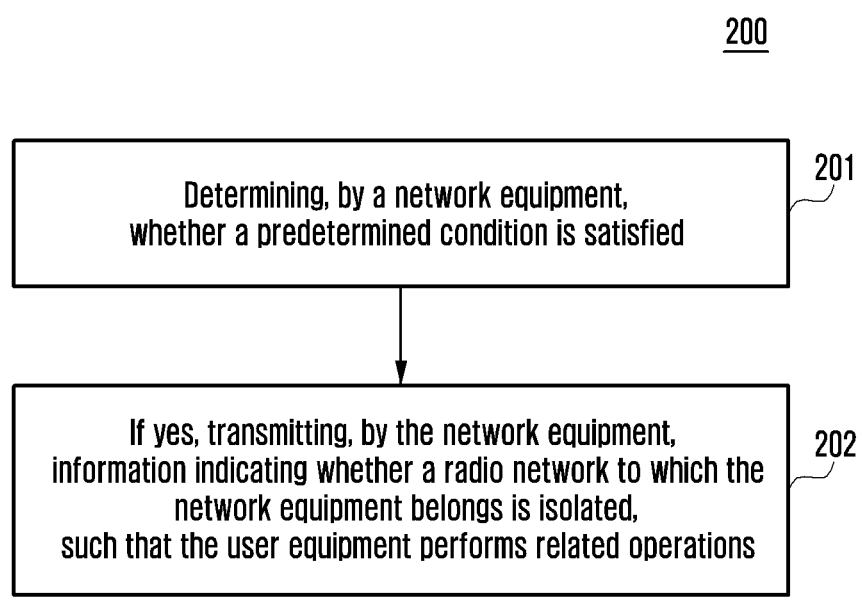
FIG. 2 illustrates a flowchart 200 of one example of the method for enabling the user equipment to access the radio network provided by the present application and implemented at the network equipment's side.

FIG. 2 illustrates a flowchart 200 of one embodiment of the method for enabling a user equipment to access a radio network provided by the present application and implemented at the network equipment's side. The flowchart 200 comprises the following steps 201 and 202.

At step 201, the network equipment determines whether a predetermined condition is satisfied.

The predetermined condition may be an expiration of a predetermined time, or the network equipment is enabled as in a state of isolated network, or a change of a state of network equipment, wherein the change comprises a change from a state of macro network connection to a state of isolated network, a change from one isolated network to another isolated network, or a recovery from the state of isolated network to the state of macro network connection.

At step 202, the network equipment transmits information indicating whether a radio network to which the network equipment belongs is isolated, such that the user equipment performs related operations, if it is determined that the predetermined condition is satisfied.

FIG. 3 illustrates a flowchart 300 of one embodiment of the method for enabling the user equipment to access the radio network provided by the present application and implemented at the user equipment's side. The flowchart 300 comprises the following steps 301 and 302.

At step 301, the user equipment receives, from the network equipment, information indicating whether the network equipment is isolated, which is transmitted by the network equipment in response to a predetermined condition being satisfied.

The predetermined condition is that described at step 201, and thus the description thereof is omitted here.

At step 302, the user equipment performs related operations according to the information.

Different predetermined conditions may correspond to different indications, respectively. The exemplary implementations for enabling the user equipment to access the radio network according to the present application will be described hereinafter in connection with specific embodiments.

Embodiment 1

In the embodiment, the predetermined condition is a change of a state of network equipment, and the details thereof are described in step 201 and are not repeated here. In the embodiment, the step of transmitting information indicating whether the radio network to which the network equipment belongs is isolated may include a step of instructing the user equipment to detach or re-attach, that is, instructing indirectly or implicitly that the radio network has been isolated. The network equipment may be a base station, eNB or an MME.

Figure 4:
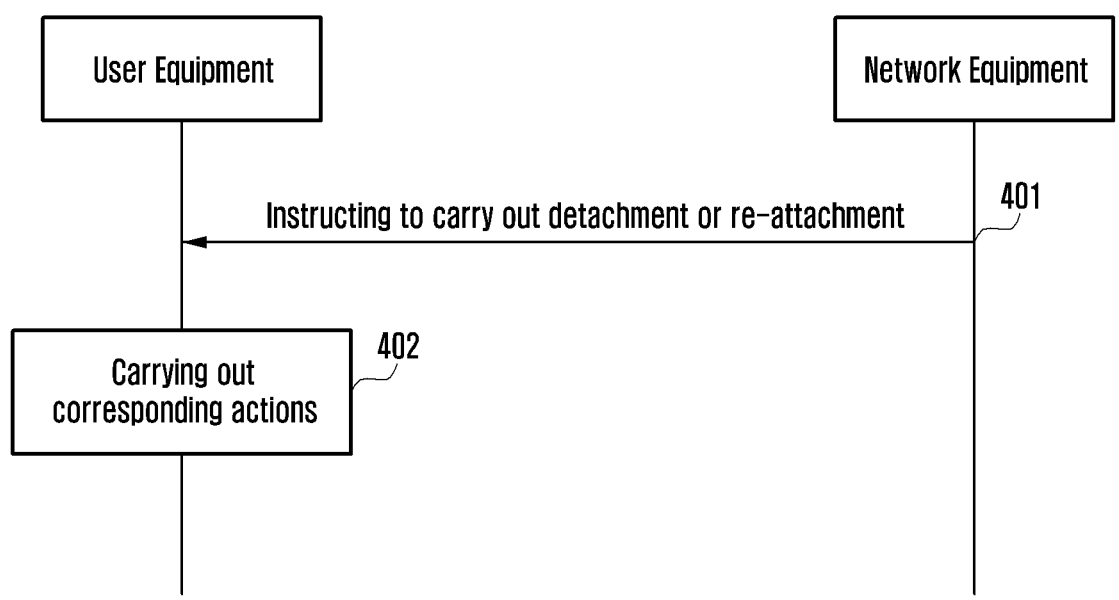
FIG. 4 illustrates an example of signaling flow transmitted between UE and the network equipment according to an embodiment of the present application.

FIG. 4 illustrates an example of signaling flow transmitted between UE and the base station according to the embodiment of the present application. Those skilled in the art can understand that for purposes of illustration and ease of understanding, one or more particular technical details are illustrated and described in the following description, but the embodiments of the present application may be implemented without these features.

As shown in FIG. 4, the following steps 401-402 are included.

At step 401, the network equipment determines that its state changed so as to instruct the user equipment to carry out detachment or re-attachment. The change in state is described in step 201, and thus the description thereof is omitted here.

In some embodiments, the isolated network generally only allows the public safety UE or the UE having subscription information of allowing the UE to access. Therefore, when the state of the base station has been changed, for a UE accessing previously, if the core network to which the base station connected after state changed does not have the UE context, the base station may release connections of these user equipment's. In addition, the nonpublic safety UE accessing previously or the UE having subscription information of not allowing the UE to access may be instructed to detach; and the public safety UE or the UE having subscription information of allowing the UE to access may be instructed to re-attach to the isolated network, in order to be served by the isolated network.

At step 402, the user equipment receives instructions of detachment or re-attachment from the network equipment. The user equipment performs corresponding actions, such as detachment, i.e., deleting the context of previously attached EPS, or re-attachment, i.e., initiating attachment to the network equipment, according to the received instructions.

Figure 5:
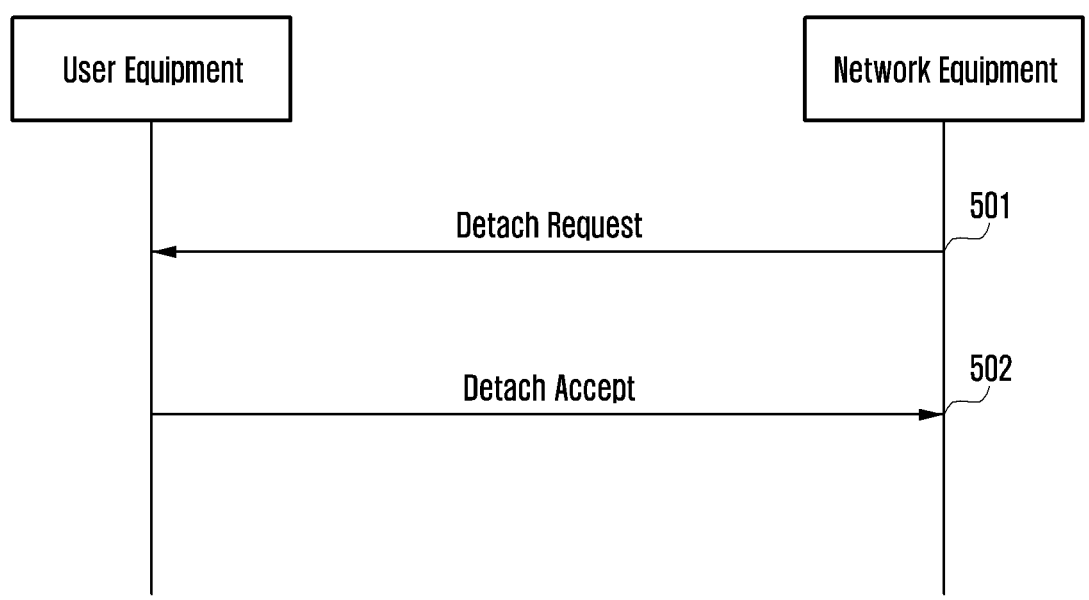
FIG. 5 illustrates an exemplary implementation of signaling flow between UE and the network equipment, for enabling UE to access the radio network according to an embodiment of the present application.

FIG. 5 illustrates an exemplary implementation of signaling flow between UE and a network equipment (such as a base station or an MME to which the base station connects) for enabling UE to access the radio network according to an embodiment of the present application.

In the implementation, after it is determined that the state has changed, the network equipment initiates detachment or re-attachment to the UE. The change of state is described in step 201, and thus the description thereof is not repeated here.

As shown in FIG. 5, the following steps 501 and 502 are included.

At step 501, after the state of the base station changed, the base station or MME to which the base station connects may transmit a detach request message to UE which needs to be detached, thereby instructing the UE to detach or re-attach.

The change in state is described in step 201, and thus the description thereof is omitted here.

Alternatively, the network equipment may determine the user equipment (UE) which needs to be detached or re-attached, according to the radio context of the user equipment (UE) in the radio access network. When a radio context of one UE exists in the base station, it can deduce that, before the state of the base station has changed, the UE has attached to the core network to which the base station connects before state changed.

Alternatively, the isolated network may be preconfigured with the information of the public safety UE or the subscription information of the UE which is allowed to access.

Alternatively, the above request message may also indicate UE that the state of the base station to which the UE accesses has changed, that is, changing from a state of macro network connection to a state of isolated network, changing from one isolated network to another isolated network, or recovering from the state of isolated network to the state of macro network connection. Additionally, the above request message may also indicate the identification of the isolated network to which the present base station belongs.

At step 502, the UE may perform corresponding actions, such as detach, i.e., deleting the context of EPS, according to the instructions transmitted by the base station. Alternatively, UE may also return detach accept message to the base station.

If the base station indicates that its state has changed, UE may know the state change of the base station. For example, the network to which the base station belongs changes to the state of isolated network from the state of macro network connection, changes to another isolated network from one isolated network, or recovers to the state of macro network connection from the state of isolated network. At this time, the core network to which the changed base station connects may not have the context of UE, and generally there is no interconnection and interworking between the core network to which the base station connects after state changed and the core network to which the base station connects before state changed. If UE still wants to obtain network services through the base station, an attachment should be initiated to the network to which the base station belongs. UE may determine whether it is allowed to access the network after the base station changed, according to the subscription information of UE. The UE which is not allowed to access does not need to initiate attachment to the isolated network to which the base station belongs, thereby reducing access load of the isolated network. The nonpublic safety UE does not generally allow to access the isolated network, and its subscription information does not contain information of allowed to access the isolated network.

If the base station indicates information of the isolated network to which the base station belongs, UE may determine whether the base station changes to the isolated state from the state of macro network connection, or whether the isolated network to which the base station belongs changes. In the case of the state has changed, if UE wants to obtain the network service through the base station, UE needs to initiate attachment to the core network to which the base station belongs. UE may determine whether it is allowed to access the isolated network to which the base station belongs, according to whether the subscription information comprises the identification of the isolated network to which the base station belongs. The UE which is not allowed to access does not need to initiate attachment to the isolated network to which the base station belongs, thereby reducing access load of the isolated network. The information of the isolated network may be PLMN identification, TA identification and CSG identification which are dedicated to the isolated network, as well as an identification which is dedicated to the isolated network or UE class (e.g. access class) which is allowed to access by the isolated network.

Figure 6:
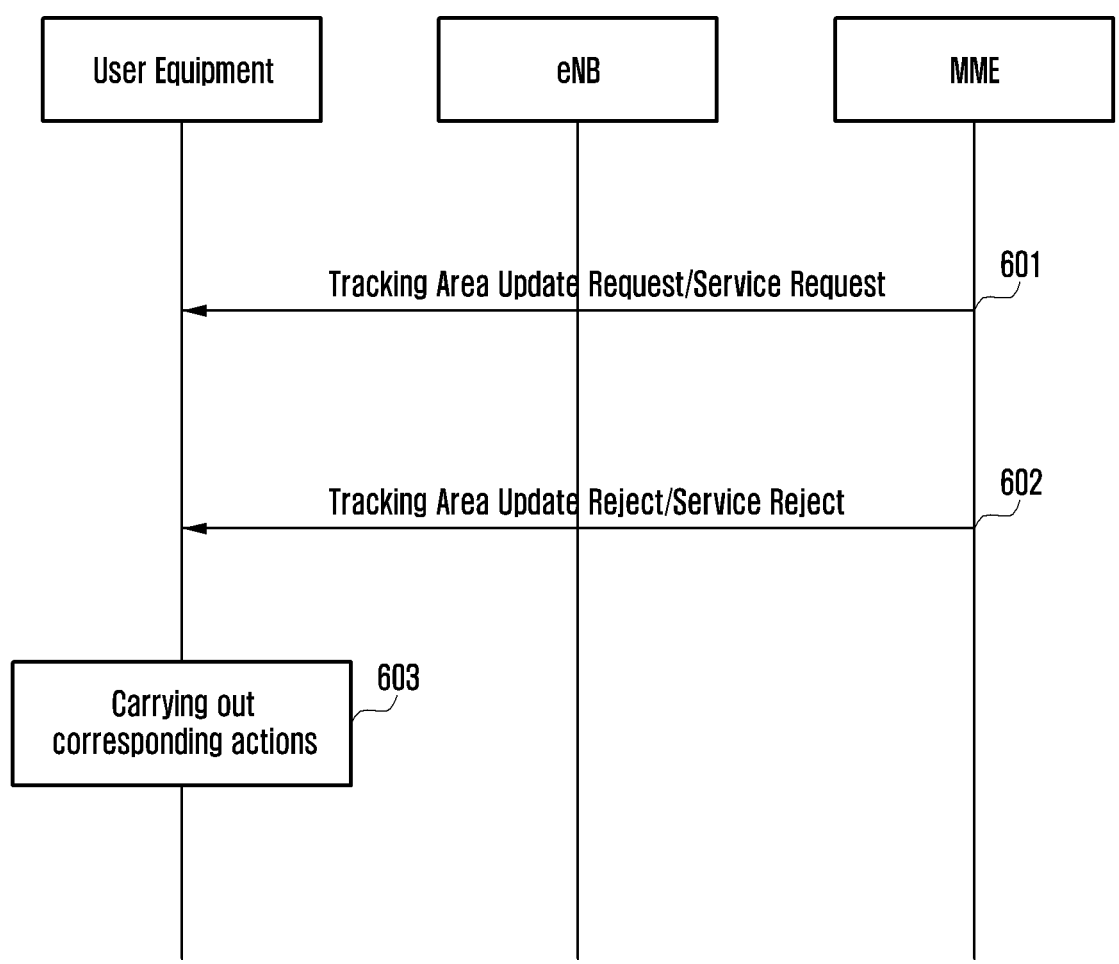
FIG. 6 illustrates another exemplary implementation of signaling flow between UE and the network equipment, for enabling UE to access the radio network according to an embodiment of the present application.

FIG. 6 illustrates another exemplary implementation of signaling flow between UE and the network equipment for enabling UE to access radio network according to an embodiment of the present application. In this implementation, when a tracking area update request message or a service request message transmitted by the user equipment (UE) is received after the state of network equipment has changed, if there is no context of the above user equipment (UE), a tracking area update reject message or a service reject message is transmitted to UE.

As shown in FIG. 6, the following steps 601 to 603 are included.

At step 601, UE transmits the tracking area update request or service request to the network equipment (a base station or an MME to which the base station connects).

Alternatively, when the network equipment determines that its state changes to the state of isolated network from the state of macro network connection or changes to another isolated network from one isolated network, the network equipment may modify the tracking area identification (TAI) of a cell to a preset TAI supported by the network to which the base station belongs, wherein the preset TAI of the macro network is different from TAI of the isolated network, and TAI of different isolated networks are different too. Therefore, when the state of the network equipment has changed, the TAI supported by the cell of the network equipment is different from that before state changed, and the UE attached to the network of the base station before state changed may detect a new TAI, and thus the UE will transmit the tracking area update request message to the corresponding network equipment.

At step 602, if there is no context of UE in the MME to which the base station connects, the base station or the MME to which the base station connects returns the tracking area update reject or service reject message to UE. The reject message may indicate one or more of re-attachment, there is no UE context, the identification of isolated network, or the base station to which the UE accesses turns into a state of isolated network.

At step 603, UE performs corresponding actions, such as detach, i.e., deleting the context of EPS, according to the instructions transmitted by the base station or the MME to which the base station connects.

If the base station or MME to which the base station connects indicates the state of isolated network, or if it is the macro network to which UE attached previously through the base station, UE knows no UE context exists in the core network to which the base station newly connects, and there are no interconnection and interworking between the core network and the core network of the macro network. If UE still wants to obtain the network service through the base station, UE needs to initiate attachment to the core network to which the base station belongs. The UE which is not allowed to access the isolated network does not need to initiate attachment to the isolated network to which the base station belongs, thereby reducing access load of the isolated network. The non public safety UE generally does not allowed to access the isolated network, and its subscription information doesn't include the information of the access permission of the isolated network is not included in the subscription information.

The detail operations in which the base station or MME to which the base station connects indicates the identification of isolated network to which it belongs may be referred to the descriptions in step 502, and thus are not repeated here.

Figure 7:
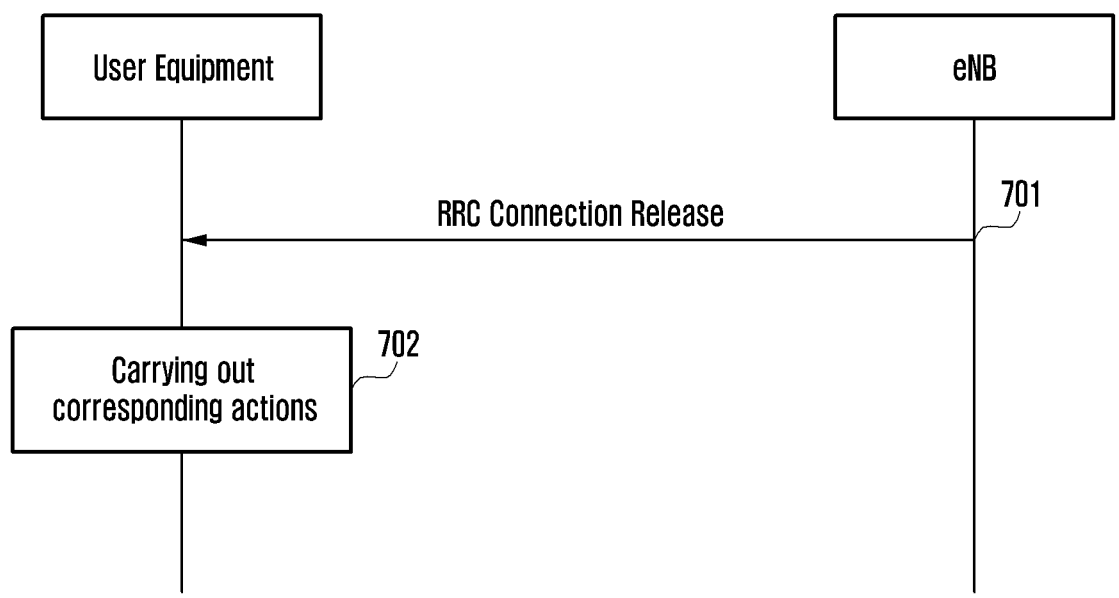
FIG. 7 illustrates further exemplary implementation of signaling flow between UE and the network equipment, for enabling UE to access the radio network according to an embodiment of the present application.

FIG. 7 illustrates further exemplary implementation of signaling flow between UE and the network equipment, for enabling UE to access radio network according to an embodiment of the present application.

In this implementation, when the network equipment detects that its state has changed, the network equipment disconnect the UE in connected mode. The change of state is described in step 201, and thus is not repeated here.

As shown in FIG. 7, the following steps 701 and 702 are included.

At step 701, the base station detects that its state has changed and transmits a RRC release message to UE in connected mode, to instruct UE to detach or re-attach, or indicate the base station to which the UE accesses turns into the state of isolated network, i.e., in a satisfied condition of isolated state. Alternatively, an identification of the isolated network to which the current base station belongs may be indicated. The change of state is described in step 201, and thus is not repeated here.

At step 702, after receiving the instruction, UE performs related operations according to the indication. The operations associated with detach include deleting the context of original EPS. The operations associated with re-attachment include initiating attachment to the network equipment.

Embodiment 2

In this embodiment, the predetermined condition comprises an expiration of the predetermined time, or the network equipment being directly initiated as the isolated state, or the state of network equipment being changed. The predetermined condition is described in step 201, and thus is not repeated here. In this embodiment, the step of transmitting information by the network equipment which indicates whether the network to which the network equipment belongs is isolated may include broadcasting cell system information. The network equipment may be a base station.

Figure 8:
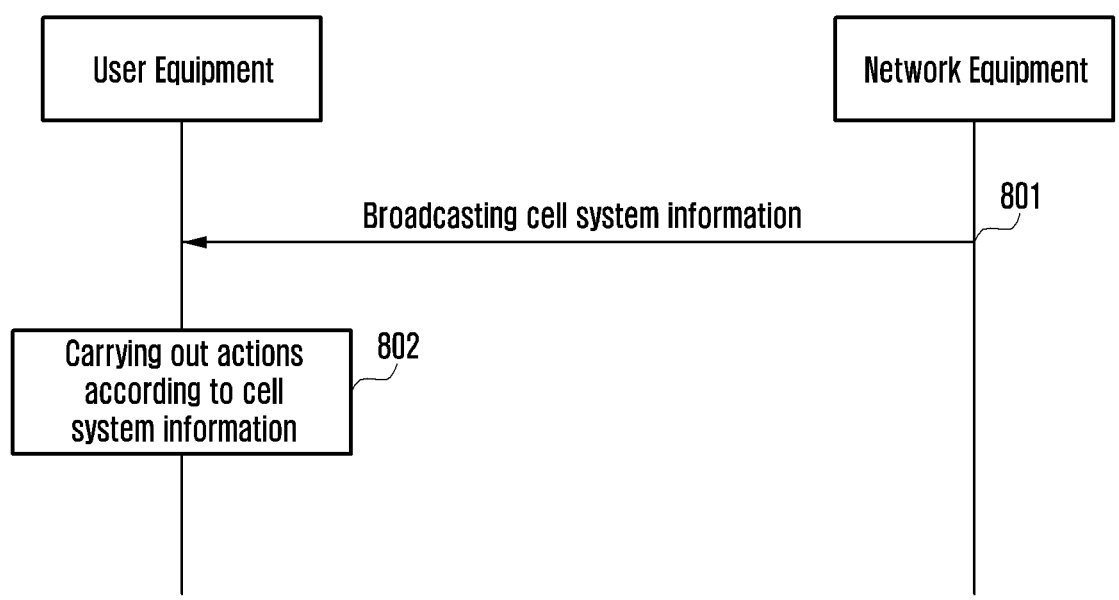
FIG. 8 illustrates an exemplary implementation of signaling flow between UE and the network equipment, for enabling UE to access the radio network according to an embodiment of the present application.

FIG. 8 illustrates an example of signaling flow between UE and the network equipment according to an embodiment of the present application. As shown in FIG. 8, the following steps 801 and 802 are included.

At step 801, the network equipment detects that the predetermined condition is satisfied, i.e., the change of state occurs, or the network equipment is directly initiated to the isolated state, or the predetermined time expires, and broadcasts the cell system information to indicate whether the network to which the network equipment belongs is isolated for performing related operations by the user equipment.

The predetermined condition may be referred to the descriptions in step 201, and thus is not repeated here.

In this embodiment, the cell system information dedicated to the isolated radio network may include at least one or more of items as below: a Public Land Mobile Network (PLMN) identification dedicated to the isolated radio network; a Tracking Area Identification (TAI) dedicated to the isolated radio network; a Closed Subscriber Group (CSG) identification dedicated to the isolated radio network; an identification dedicated to the isolated radio network; an isolated state indication; a cell barring indication; an Access Class Barring (ACB) information of the isolated network.

(1) In one implementation, the cell system information dedicated to the isolated radio network may be PLMN dedicated to the isolated radio network. PLMN may not allow non public safety UE to access, or not allow UE having subscription information which does not allow PLMN to access. Alternatively, PLMN may allow the public safety UE to access, or allow UE having subscription information which allows PLMN to access.

(2) In another implementation, the cell system information dedicated to the isolated radio network may be the tracking area (TA) identification dedicated to the isolated radio network. The TA may not allow of the nonpublic safety UE to access, or not allow the access of the UE which is restricted by the TA. Alternatively, TA may allow the public safety UE to access, or allow the access of the UE which is not restricted by the TA.

(3) In further implementation, the cell system information dedicated to the isolated radio network may be CSG identification dedicated to the isolated radio network. The CSG may not allow the nonpublic safety UE to access, or may not allow the access of the UE which is not a member of the CSG. Alternatively, the CSG may allow the public safety UE to access, or allow the access of the UE which is a member of the CSG.

(4) In yet another implementation, the cell system information dedicated to the isolated radio network may be the identification dedicated to the isolated radio network. For all cells in one isolated radio network, a same identification of the isolated radio network may be broadcasted.

(5) In yet another implementation, the cell system information dedicated to the isolated radio network may be the isolated state indication of the radio network. When the indication indicates the state of isolation, it is allowed the access of the UE having the subscription information which allows the UE to access the isolated network, while it is not allowed the access of the UE having the subscription information which does not allow the UE to access the isolated network.

(6) In yet another implementation, the cell system information dedicated to the isolated radio network may be the cell barring indication which indicates that it is allowed the access of UE having the subscription information which allows the UE to access the isolated network, while it is not allowed the access of the UE having the subscription information which does not allow the UE to access the isolated network.

(7) In yet another implementation, the cell system information dedicated to the isolated radio network may be the information indicating whether the user equipment is detached or re-attached.

(8) In yet another implementation, the cell system information dedicated to the isolated radio network may be the ACB (Access Class Barring) information of the isolated radio network, wherein the ACB information indicates the classes of the user equipment which is allowed or rejected to access the isolated radio network. The ACB information implements restriction to the UE class of the nonpublic safety UE. The public safety UE may be configured with a dedicated access class, so that the nonpublic safety UE is rejected to access the isolated radio network, while the public safety UE is allowed to access the isolated radio network.

At step 802, after the change of cell system information or the cell system information dedicated to the isolated network is monitored, UE may perform corresponding actions according to specific circumstance of the cell system information.

In some embodiments, according to one or more of the following information: the public land mobile network (PLMN) identification dedicated to the isolated radio network; the tracking area identification (TAI) dedicated to the isolated radio network; the closed subscriber group (CSG) identification dedicated to the isolated radio network; the identification dedicated to the isolated radio network; the isolated state indication; the cell barring indication; and the access Class Barring (ACB) information of the isolated network, UE may determine that the network to which the base station belongs has changed, such as changing to the state of isolated network from the state of macro network connection, changing to another isolated network from one isolated network, or recovering to the state of macro network connection from the state of isolated network. The cell system information is described in step 802, and thus is not repeated here. For a UE having the subscription information which allows the UE to access the network to which the base station belongs, if the UE wants to obtain the service of the network, the attachment is needed to be initiated.

(1) When the cell system information dedicated to the isolated radio network is the PLMN identification, the TA identification, the CSG identification or the identification of isolated network, UE may determine that the network to which the base station belongs has changed according to the above change of cell system information.

(2) When the cell system information dedicated to the isolated radio network is in the isolated state, the cell barring indication or the access class barring, UE may determine that the base station is in the state of isolated network, according to the isolated state turning into isolated or the state of cell barring being true, or the access class barring only allowing the class which is dedicated to public safety UE. Otherwise, the base station is in the state of macro network connection.

(3) When the cell system information dedicated to the isolated radio network is in the isolated state and/or the identifications of (1), UE may determine that the network to which the base station belongs has changed, according to the above change of cell system information.

(4) When the cell system information dedicated to the isolated radio network is the cell barring indication and/or the identifications of (1), UE may determine that the network to which the base station belongs has changed, according to the above change of cell system information.

(5) When the cell system information dedicated to the isolated radio network is the access class barring and/or the identifications of (1), UE may determine that the network to which the base station belongs has changed, according to the above change of cell system information.

In some embodiments, the rejected PLMN of isolated network will be saved in the PLMN rejection list of UE. When the base station is recovered to the state of macro network connection, the PLMN is deleted from the PLMN rejection list.

In some embodiments, UE detects whether it is allowed to access the isolated network to which the base station belongs, based on the preset subscription information. In some implementation, the subscription information of UE may be information of whether it is allowed to access the isolated network, or whether it is allowed to access the dedicated isolated network, indicating the identification information of the isolated network. In some implementation, the information about whether it is allowed to access the isolated network may be the PLMN identification, the TA identification, the CSG identification, the UE access class which is allowed by the isolated network, or the cell barring indication of the isolated network.

In some implementation, the identification information dedicated to the isolated network may be the PLMN identification, the TA identification, the CSG identification or the access class.

In some implementation, the subscription information of isolated network and the subscription information of non-isolated network are separated.

In some other embodiments, when the area where UE is located in the coverage of a plurality of network, UE may receive a plurality of cell system information. At this time, according to the cell system information, UE may determine firstly whether both the detected cell(s) and the cell previously camped by the UE belong to the same isolated network, or both of them belong to the macro network, or whether there is a connection between the network to which this detected cell belongs and the network of the cell previously camped by the UE. During the re-selection of cell, the cell which belongs to the same isolated network previously camped by the UE or belongs to the same macro network or which has connections with the of the cell previously camped by the UE is preferably selected.

In some embodiments, if the cell reselected after the re-selection belongs to a different isolated network from the cell previously camped by the UE, or the reselected cell and the cell previous camped are not all belongs to the macro network, or the reselected cell has no connection the network of the cell previously camped by the UE, attachment should be initiated by the UE to the network equipment's of the reselected cell.

Figure 9:
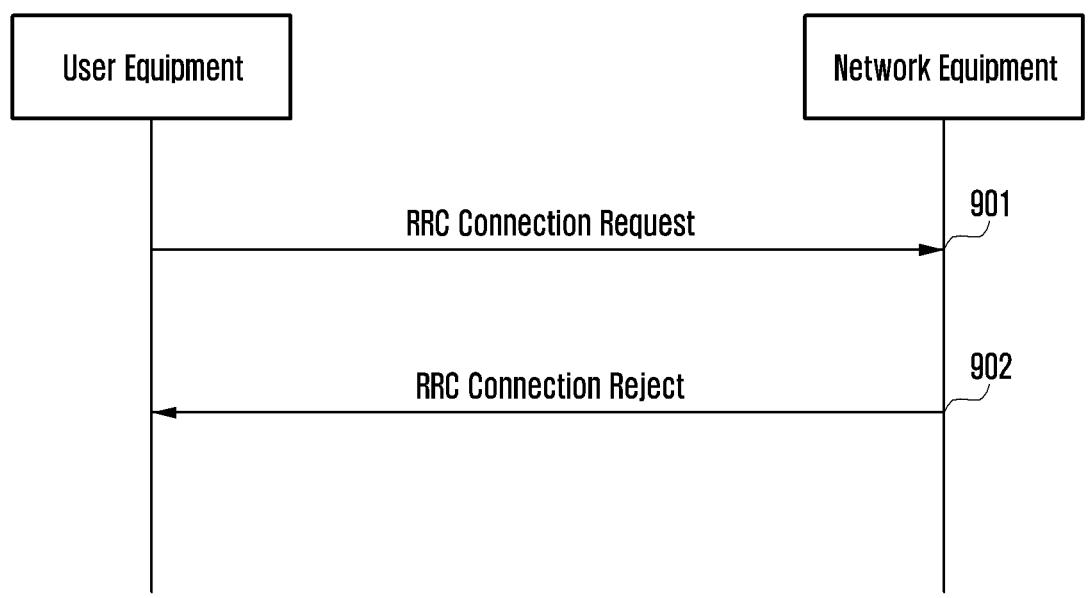
FIG. 9 illustrates another exemplary implementation of signaling flow between UE and the network equipment, for enabling UE to access the radio network according to an embodiment of the present application.

FIG. 9 illustrates another exemplary implementation of signaling flow between UE and the network equipment for enabling UE to access radio network according to an embodiment of the present application.

In this implementation, a process of attaching to the isolated network to which the base station belongs by the user equipment is shown.

As shown in FIG. 9, the following steps 901 and 902 are included.

At step 901, UE requests the isolated base station for establishing a RRC connection. A UE class indication is indicated in the RRC connection request message. The UE is a public safety UE class. For the UE in non-public safety class, the indication is not included in the RRC connection.

At step 902, the isolated base station rejects directly the RRC connection request message which does not include the UE class indication and transmits a RRC connection reject message.

With this operation, the connection request of nonpublic safety UE is rejected directly. Especially when accidence occurs, the access capacity of the isolated base station can be avoided to be over occupied by a large number of connection establishment requests of nonpublic safety UE, which may cause public safety UE fail to access normally.

It can be seen from the above descriptions of embodiments of the present application, regardless of radio access network entities losing backhaul network connections or the nomadic access network entities, users with public safety and the like may be provided with reliable local bearer support of service continuity. The proposed technical solution may meet communication requirements for public safety in the circumstances of disasters.

Figure 10:
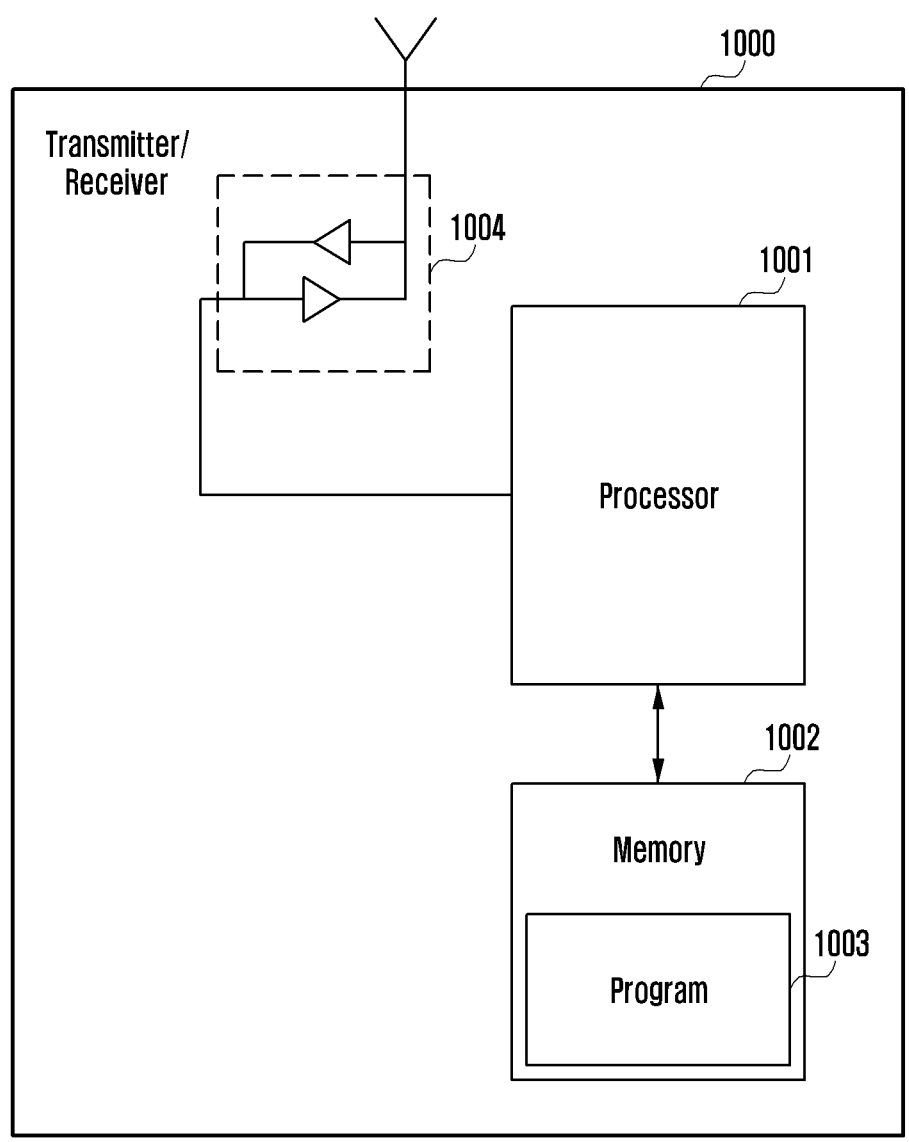
FIG. 10 is a simplified block diagram of an entity of various exemplary embodiments adaptable to implement the present application.

FIG. 10 is a simplified block diagram of an entity 1000 of various exemplary embodiments adaptable to practice the present application. The entity 1000 may be configured to be an apparatus at network side, such as a base station. The entity 1000 may also be configured to an apparatus at user side, such as a user terminal.

As shown in FIG. 10, the entity 1000 comprise a processor 1001, a memory 1002 coupled to the processor 1001, and a suitable radio frequency (RF) transmitter/receiver 1004 coupled to the processor 1001. The memory 1002 stores programs 1003. The transmitter/receiver 1004 is suitable for two-way radio communication. It should be noted that the transmitter/receiver 1004 has at least one antenna for assisting communication, and in practice, the base station or UE may have a plurality of antennas. The entity 1000 may be coupled to one or more external networks or systems, such as internet, via data paths.

The program 1003 may comprise program commands. When the program commands are executed by associated processor 1001, the entity 1000 may operate according to the respective exemplary embodiments of the present application.

The embodiments of the present application can be implemented by computer software which could be executed by the processor 1001 of the entity 1000, or by hardware, or by the combination of software and hardware.

The memory 1002 may be any appropriate type of memory suitable for local technical environment, and may be achieved by any appropriate data-storage technology, for example, a memory device and system based on semiconductor, a magnetic memory device and system, an optical memory device and system, a fixed memory and a removable memory, which are only some non-restrictive examples. Although only one memory is illustrated in the entity 1000, a plurality of physically independent memory units may be contained by the entity 1000. The processor 1001 may be any appropriate type of processor suitable for local technical environment, and may comprise one or more of the followings: a general-purpose computer, a special-purpose computer, a microprocessor, a digital signal processor (DSP) and a processor based on multi-core architecture, which are only some non-restrictive examples.

When the entity 1000 is configured to be apparatus at network side, that is, the entity 1000 is a network equipment such as a base station, etc. in some embodiments, the processor 1001 is configured to determine whether the predetermined condition is satisfied, and if it is determined that the predetermined condition is satisfied, the processor 1001 controls the transmitter to transmit the information indicating whether the radio network to which the network equipment belongs is isolated.

The transmitter of transmitter/receiver 1004 is configured to transmit the above information under control of the above processor.

The processor 1001 is also configured to control the above receiver and transmitter to perform related operations with the user equipment.

When the entity 1000 is configured to be an apparatus at user side, that is, the entity 1000 is a user equipment, in some embodiments, the receiver of transmitter/receiver 1004 is configured to receive, from the network equipment, the information indicating whether the radio network to which the network equipment belongs is isolated, wherein the information is transmitted by the network equipment in response to predetermined conditions being satisfied.

The processor 1001 is configured to control the above the transmitter to perform related operations, according to the above information.

It should be comprehended that, each unit comprised in the entity 1000 is configured to implement the exemplary embodiments disclosed in the present application. Therefore, the above operations and feathers described by combining FIG. 2 to FIG. 9 are also applicable to the entity 1000 and the units therein, and a detailed description thereof will be omitted herein.

In addition, there is provided a computer readable storage medium, which may be the computer readable storage medium contained in the source base station, the target base station or the secondary base station in the above embodiments, or a computer readable storage medium individually exists rather than being fitted into any apparatus. There is one or more computer programs stored on the computer readable storage medium, and one or more processors run the one or more computer programs to perform the method for a user equipment accessing to a radio network mentioned in the present application.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

What is claimed is:

1. A method by a base station in a wireless communication system, the method comprising:
    detecting a loss of a backhaul between the base station and a macro core network;
    determining to activate an operation of a mode for an isolated network based on the detection;
    transmitting system information including a public land mobile network (PLMN) identity dedicated to the isolated network in case that the mode for the isolated network is in operation based on the determination; and
    receiving, from a user equipment (UE), a message for attaching to the isolated network.

2. The method of claim 1, wherein the system information further includes information associated with a tracking area dedicated to the isolated network.

3. The method of claim 1, wherein the isolated network is accessed by the UE with a predetermined access class.

4. The method of claim 1, wherein the system information further includes at least one of a closed subscriber group (CSG) identifier dedicated to the isolated network, an identifier dedicated to the isolated network, and information on an access class indicating at least one access class of the UE which is allowed or rejected to access the isolated network.

5. The method of claim 1, wherein an access of the UE to the isolated network is determined based on subscription information indicating whether a PLMN allows the UE to access to the isolated network.

6. A method by a user equipment (UE) in a wireless communication system, the method comprising:
    receiving system information transmitted from a base station operating in an isolated network mode, the system information including a public land mobile network (PLMN) identity dedicated to the isolated network;
    identifying whether the UE is capable of accessing the isolated network; and
    transmitting, to the base station, a message for attaching to the isolated network using the system information, based on the identification.

7. The method of claim 6, wherein the system information further includes information associated with a tracking area dedicated to the isolated network.

8. The method of claim 6, wherein the UE with a predetermined access class is capable of attaching to the isolated network.

9. The method of claim 6, wherein the system information further includes at least one of a closed subscriber group (CSG) identifier dedicated to the isolated network, an identifier dedicated to the isolated network, and information on an access class indicating at least one access class of the UE which is allowed or rejected to access the isolated network.

10. The method of claim 6, wherein an access of the UE to the isolated network is determined based on subscription information indicating whether a PLMN allows the UE to access to the isolated network.

11. A base station in a wireless communication system, the base station comprising:
    a transceiver; and
    a controller coupled with the transceiver and configured to control to:
    detect a loss of a backhaul between the base station and a macro core network,
    determine to activate an operation of a mode for an isolated network based on the detection,
    transmit system information including a public land mobile network (PLMN) identity dedicated to the isolated network in case that the mode for the isolated network is in operation based on the determination, and
    receive, from a user equipment (UE), a message for attaching to the isolated network.

12. The base station of claim 11, wherein the system information further includes information associated with a tracking area dedicated to the isolated network.

13. The base station of claim 11, wherein the isolated network is accessed by the UE with a predetermined access class.

14. The base station of claim 11, wherein the system information further includes at least one of a closed subscriber group (CSG) identifier dedicated to the isolated network, an identifier dedicated to the isolated network, and information on an access class indicating at least one access class of the UE which is allowed or rejected to access the isolated network.

15. The base station of claim 11, wherein an access of the UE to the isolated network is determined based on subscription information indicating whether a PLMN allows the UE to access to the isolated network.

16. A user equipment (UE) in a wireless communication system, the UE comprising:
    a transceiver; and
    a controller coupled with the transceiver and configured to control to:
    receive system information transmitted from a base station operating in an isolated network mode, the system information including a public land mobile network (PLMN) identity dedicated to the isolated network,
    identify whether the UE is capable of accessing the isolated network, and
    transmit, to the base station, a message for attaching to the isolated network using the system information, based on the identification.

17. The UE of claim 16, wherein the system information further includes information associated with a tracking area dedicated to the isolated network.

18. The UE of claim 16, wherein the UE with a predetermined access class is capable of attaching to the isolated network.

19. The UE of claim 16, wherein the system information further includes at least one of a closed subscriber group (CSG) identifier dedicated to the isolated network, an identifier dedicated to the isolated network, and information on an access class indicating at least one access class of the UE which is allowed or rejected to access the isolated network.

20. The UE of claim 16, wherein an access of the UE to the isolated network is determined based on subscription information indicating whether a PLMN allows the UE to access to the isolated network.

* * * * *